(12) United States Patent
Singh et al.

(10) Patent No.: US 8,300,661 B2
(45) Date of Patent: Oct. 30, 2012

(54) SYSTEM AND METHOD FOR WIRELESS COMMUNICATION OF UNCOMPRESSED VIDEO USING MODE CHANGES BASED ON CHANNEL FEEDBACK (CF)

(75) Inventors: Harkirat Singh, Santa Clara, CA (US); Pengfei Xia, Mountain View, CA (US); Huai-Rong Shao, San Jose, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1181 days.

(21) Appl. No.: 11/733,633

(22) Filed: Apr. 10, 2007

(65) Prior Publication Data

US 2008/0253462 A1 Oct. 16, 2008

(51) Int. Cl.
 *H04J 3/24* (2006.01)
(52) U.S. Cl. ........ 370/473; 370/470; 370/474; 370/472; 370/476
(58) Field of Classification Search .................. 370/473, 370/470, 474, 472, 476
 See application file for complete search history.

(56) References Cited

U.S. PATENT DOCUMENTS

| | | | | |
|---|---|---|---|---|
| 5,083,206 | A * | 1/1992 | Knauer et al. | 375/240.1 |
| 7,016,409 | B2 * | 3/2006 | Unger | 375/240.02 |
| 2003/0067991 | A1 * | 4/2003 | Okamoto | 375/262 |
| 2004/0131115 | A1 * | 7/2004 | Burgess et al. | 375/240.01 |
| 2004/0157560 | A1 * | 8/2004 | Yamasaki | 455/63.1 |
| 2007/0098063 | A1 * | 5/2007 | Reznic et al. | 375/240.2 |
| 2007/0204205 | A1 | 8/2007 | Niu et al. | |
| 2007/0240191 | A1 | 10/2007 | Singh et al. | |
| 2011/0075645 | A1 * | 3/2011 | Yano et al. | 370/338 |

OTHER PUBLICATIONS

Distributed Medium Access Control (MAC) for wireless networks, WiMedia Alliance, Draft 0.99, Nov. 1, 2005.
High Definition Multimedia Interface (HDMI) Specifications version 1.2, Aug. 22, 2005.
IEEE 802.15.3 Working Group. Part 15.3: Wireless medium access control (MAC) and physical layer (PHY) specifications for high rate wireless personal area networks (WPAN). IEEE Draft Standard, Draft P802.15.3/D16, Feb. 2003.
Maruhashi, et al., "Wireless uncompressed-HDTV-signal transmission system utilizing compact 60-GHz-band transmitter and receiver," Microwave Symposium Digest, 2005 IEEE MTT-S International, Jun. 12-17, 2005.
WirelessHD Publication of Specification Version 1.0 Overview, Oct. 9, 2007.
"NEC develops compact millimeter-wave transceiver for uncompressed HDTV signal transmission", NE Asia Online, Apr. 5, 2005.
Hachman, Mark; "CE giants back Amimon's Wireless HDTV tech", PCMAG.COM, Jul. 23, 2008.

* cited by examiner

*Primary Examiner* — Kibrom T Hailu
*Assistant Examiner* — Zewdu A Beyen
(74) *Attorney, Agent, or Firm* — Kenneth L. Sherman, Esq.; Michael Zarrabian, Esq.; Sherman & Zarrabian LLP (57) ABSTRACT

Method and system for transmission of uncompressed video information from a sender to a receiver over wireless channels are disclosed. For example, according to one embodiment, when channel conditions (e.g., noise or interference) worsens, one or more least significant bits (LSB) of pixel data are not transmitted to save bandwidth for more efficient transmission. Furthermore, the remaining one or more of the most significant bits (MSB) of the pixel data are transmitted with coding and/or modulation schemes that provides extra error protection, relative to what is needed in regular channel conditions.

41 Claims, 8 Drawing Sheets

SYSTEM AND METHOD FOR WIRELESS COMMUNICATION OF UNCOMPRESSED VIDEO USING MODE CHANGES BASED ON CHANNEL FEEDBACK (CF)

BACKGROUND OF THE INVENTION

1. Field of the Invention

The present invention relates to wireless transmission of video information, and in particular, to transmission of uncompressed high definition video information over wireless channels.

2. Description of the Related Technology

With the proliferation of high quality video, an increasing number of electronic devices, such as consumer electronic devices, utilize high definition (HD) video which can require multiple gigabits per second (Gbps) in bandwidth for transmission. As such, when transmitting such HD video between devices, conventional transmission approaches compress the HD video to a fraction of its size to lower the required transmission bandwidth. The compressed video is then decompressed for consumption. However, with each compression and subsequent decompression of the video data, some data can be lost and the picture quality can be reduced.

The High-Definition Multimedia Interface (HDMI) specification allows transfer of uncompressed HD signals between devices via a cable. While consumer electronics makers are beginning to offer HDMI-compatible equipment, there is not yet a suitable wireless (e.g., radio frequency) technology that is capable of transmitting uncompressed HD video signals. Wireless local area network (WLAN) and similar technologies can suffer from interference issues when several devices that do not have the bandwidth to carry the uncompressed HD signals are connected to the network. Accordingly a need exists for improved methods and devices of wirelessly transferring uncompressed HD signals.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Inventive Embodiments" one will understand how the features of this invention provide advantages that may include improved link robustness under poor channel conditions and reduced retransmissions, thereby improving channel efficiency.

One embodiment includes a method of transmitting uncompressed video. The method comprises transmitting uncompressed video data comprising a first number of bits for each of a plurality of pixels over a wireless channel using a first coding rate and first modulation. The method further comprises identifying a characteristic of the wireless channel. The method further comprises, in response to identifying the characteristic of the channel, transmitting uncompressed video data comprising a second number of bits for each of a second plurality of pixels over the wireless channel using a second coding rate and second modulation. The second number of bits is smaller than the first number of bits.

One embodiment includes a system for transmitting uncompressed video. The system comprises a transmitter configured to transmit uncompressed video data comprising a first number of bits for each of a plurality of pixels over a wireless channel using a first coding rate and first modulation. The system further comprises an adaptation module in communication with the transmitter and configured to identify a characteristic of the wireless channel. The transmitter, in response to the adaptation module identifying the characteristic of the channel, is further configured to transmit uncompressed video data comprising a second number of bits for each of a second plurality of pixels over the wireless channel using a second coding rate and second modulation, wherein the second number of bits is smaller than the first number of bits.

Another embodiment includes a system for transmitting uncompressed video. The system comprises means for transmitting uncompressed video data comprising a first number of bits for each of a plurality of pixels over a wireless channel using a first coding rate and first modulation. The system further comprises means for identifying a characteristic of the wireless channel. The transmitting means, in response to the identifying means, is further configured to transmit uncompressed video data comprising a second number of bits for each of a second plurality of pixels over the wireless channel using a second coding rate and second modulation, wherein the second number of bits is smaller than the first number of bits.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Certain embodiments provide a method and system for transmission of uncompressed HD video information from a sender to a receiver over wireless channels. For example, according to one embodiment, when poor channel conditions (e.g., noise or interference) are detected, one or more least significant bits (LSB) of pixel data are not transmitted.

Instead, the remaining one or more of the most significant bits (MSB) of the pixel data are transmitted with coding and/or modulation schemes that provide additional error protection. Desirably, higher picture quality can be maintained in poor channel conditions. In one embodiment, the LSB are interpolated by the receiver based on data of nearby, e.g., adjacent, pixels. In one embodiment, the transmitter transmits only the MSB data until measured channel conditions improve. In one embodiment, the transmitter transmits the MSB data for a specified time period, e.g., a fixed number of packets or subpackets, or a variable number that depends, for example, on the channel conditions.

Figure 1:
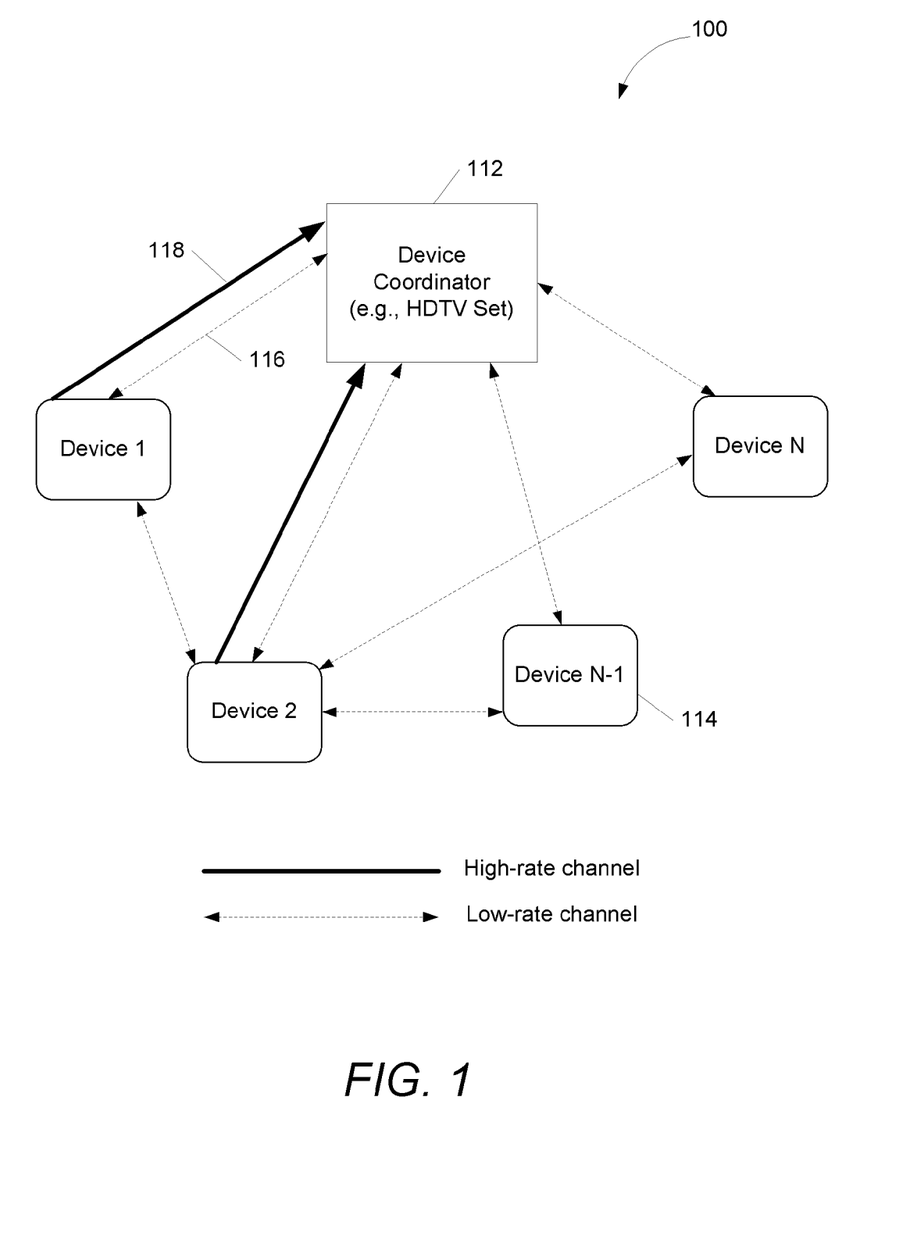
FIG. 1 is a functional block diagram of a wireless network that implements uncompressed HD video transmission between wireless devices according to one embodiment of the system and method.

Example implementations of the embodiments in a wireless high definition (HD) audio/video (A/V) system will now be described. FIG. 1 shows a functional block diagram of a wireless network 100 that implements uncompressed HD video transmission between A/V devices such as an A/V device coordinator and A/V stations, according to certain embodiments. In other embodiments, one or more of the devices can be a computer, such as a personal computer (PC). The network 100 includes a device coordinator 112 and multiple A/V stations 114 (e.g., Device 1, . . . , Device N).

The A/V stations 114 utilize a low-rate (LR) wireless channel 116 (dashed lines in FIG. 1), and may use a high-rate (HR) channel 118 (heavy solid lines in FIG. 1), for communication between any of the devices. The device coordinator 112 uses a low-rate channel 116 and a high-rate wireless channel 118, for communication with the stations 114. Each station 114 uses the low-rate channel 116 for communications with other stations 114. The high-rate channel 118 supports single direction unicast transmission over directional beams established by beamforming, with e.g., multi-GB/s bandwidth, to support uncompressed HD video transmission. For example, a set-top box can transmit uncompressed video to a HD television (HDTV) over the high-rate channel 118. The low-rate channel 116 can support bi-directional transmission, e.g., with up to 40 Mbps throughput in certain embodiments. The low-rate channel 116 is mainly used to transmit control frames such as acknowledgement (ACK) frames. For example, the low-rate channel 116 can transmit an acknowledgement from the HDTV to the set-top box. It is also possible that some low-rate data like audio and compressed video can be transmitted on the low-rate channel between two devices directly. Time division duplexing (TDD) is applied to the high-rate and low-rate channel. At any one time, the low-rate and high-rate channels cannot be used in parallel for transmission, in certain embodiments. Beamforming technology can be used in both low-rate and high-rate channels. The low-rate channels can also support omni-directional transmissions.

In one example, the device coordinator 112 is a receiver of video information (hereinafter "receiver 112"), and the station 114 is a sender of the video information (hereinafter "sender 114"). For example, the receiver 112 can be a sink of video and/or audio data implemented, such as, in an HDTV set in a home wireless network environment which is a type of WLAN. The sender 114 can be a source of uncompressed video or audio. Examples of the sender 114 include a set-top box, a DVD player or recorder, digital camera, camcorder, and so forth.

Figure 2:
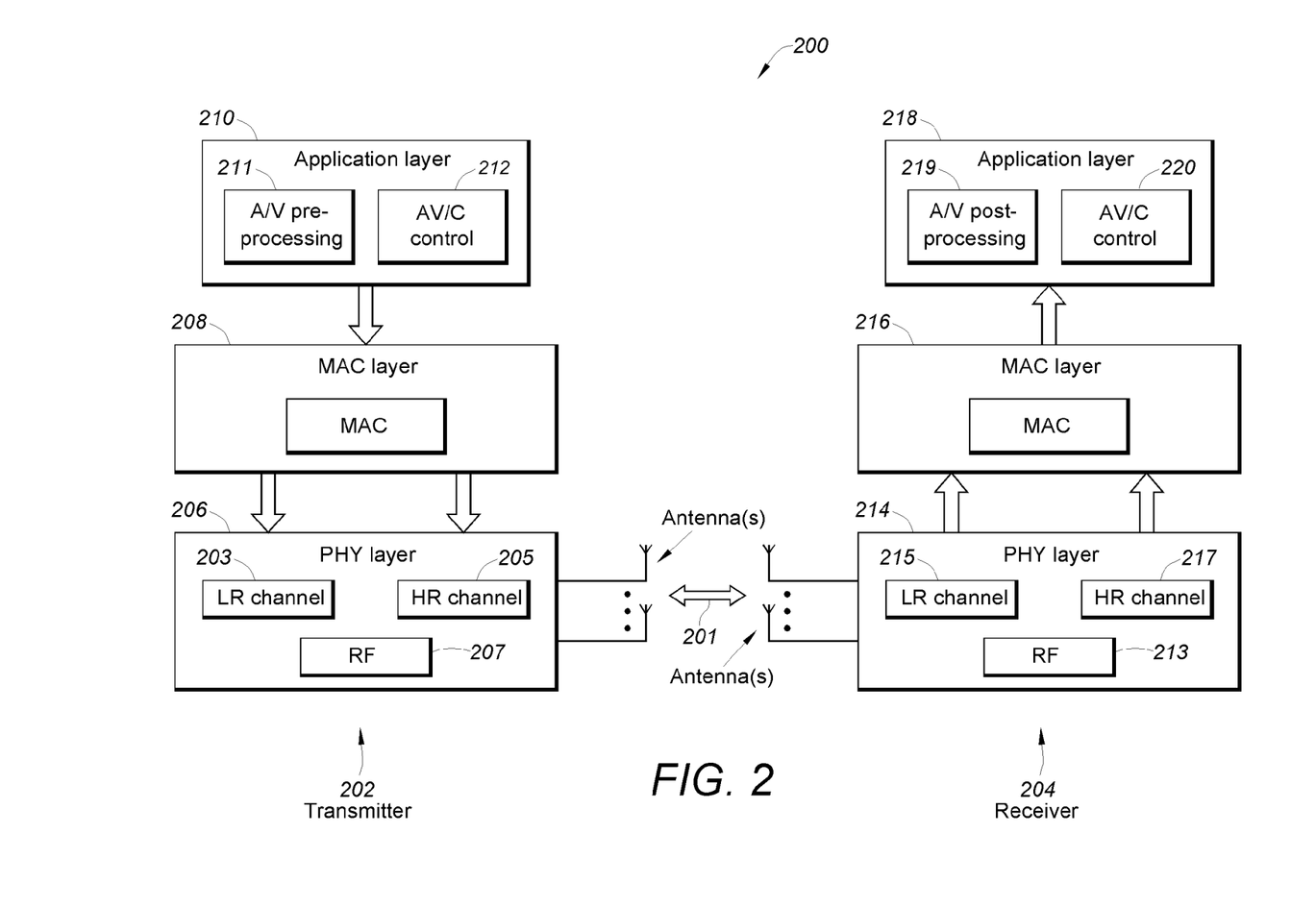
FIG. 2 is a functional block diagram of an example communication system for transmission of uncompressed HD video over a wireless medium, according to one embodiment of the system and method.

FIG. 2 illustrates a functional block diagram of an example communication system 200. The system 200 includes a wireless transmitter 202 and wireless receiver 204. The transmitter 202 includes a physical (PHY) layer 206, a media access control (MAC) layer 208 and an application layer 210. Similarly, the receiver 204 includes a PHY layer 214, a MAC layer 216, and an application layer 218. The PHY layers provide wireless communication between the transmitter 202 and the receiver 204 via one or more antennas through a wireless medium 201.

The application layer 210 of the transmitter 202 includes an A/V pre-processing module 211 and an audio video control (AV/C) module 212. The A/V pre-processing module 211 can perform pre-processing of the audio/video such as partitioning of uncompressed video. The AV/C module 212 provides a standard way to exchange A/V capability information. Before a connection begins, the AV/C module negotiates the A/V formats to be used, and when the need for the connection is completed, AV/C commands are used to stop the connection.

In the transmitter 202, the PHY layer 206 includes a low-rate (LR) channel 203 and a high rate (HR) channel 205 that are used to communicate with the MAC layer 208 and with a radio frequency (RF) module 207. In certain embodiments, the MAC layer 208 can include a packetization module (not shown). The PHY/MAC layers of the transmitter 202 add PHY and MAC headers to packets and transmit the packets to the receiver 204 over the wireless channel 201.

In the wireless receiver 204, the PHY/MAC layers 214, 216, process the received packets. The PHY layer 214 includes a RF module 213 connected to the one or more antennas. A LR channel 215 and a HR channel 217 are used to communicate with the MAC layer 216 and with the RF module 213. The application layer 218 of the receiver 204 includes an A/V post-processing module 219 and an AV/C module 220. The module 219 can perform an inverse processing method of the module 211 to regenerate the uncompressed video, for example. The AV/C module 220 operates in a complementary way with the AV/C module 212 of the transmitter 202.

Figure 3:
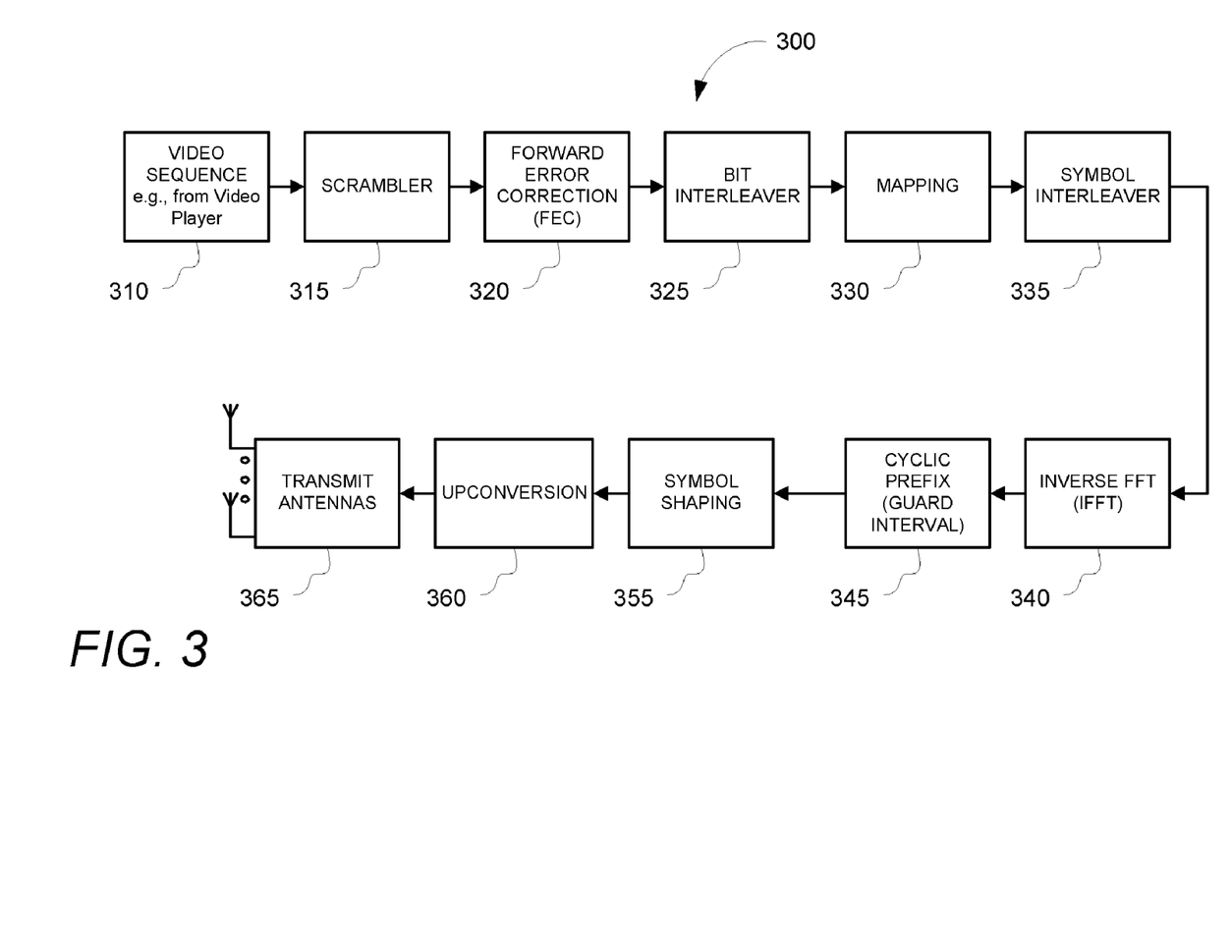
FIG. 3 is a functional block diagram illustrating an example of a transmitter such as found in the wireless network of FIG. 1.

FIG. 3 is a functional block diagram illustrating an example of a transmit chain 300 comprising modules, subsystems or devices, such as used in the PHY block 206 (FIG. 2). It will be appreciated that these modules, subsystems, or devices can be implemented using hardware, software or a combination of both. A video sequence 310 having video data, such as from a video player or other device, is input into a scrambler 315. The scrambler 315 transposes or inverts signals or otherwise encodes data to make the data unintelligible at a receiver not equipped with a corresponding descrambling device. Scrambling is accomplished by the addition of components to the original signal or the changing of some important component of the original signal in order to make extraction of the original signal difficult. Examples of the latter can include removing or changing vertical or horizontal sync pulses in video signals.

A forward error correction (FEC) subsystem 320 receives output from the scrambler and provides protection against noise, interference and channel fading during wireless data transmission. The FEC subsystem 320 adds redundant data to the scrambled video data input to the subsystem. The redundant data allows the receiver to detect and correct errors without asking the transmitter for additional data. In adding redundant data to the video data, the FEC subsystem 320 can use various error correction codes, such as a Reed-Solomon (RS) encoder and a convolutional code (CC) encoder. In other embodiments, the FEC subsystem 320 may use various other encoders, including, but not limited to, a LDPC encoder, a Hamming encoder, and a Bose, Ray-Chaudhuri, Hocquenghem (BCH) encoder.

The output of the FEC 320 is sent to a bit interleaver 325. The bit interleaver 325 rearranges a sequence of data bits received from the FEC 320. The bit interleaver 325 serves to provide further error-protection over video data transmitted over a wireless medium. The output of the bit interleaver 325 is sent to a mapper 330. The mapper 330 maps data bits to complex (IQ) symbols. The complex symbols are used to modulate a carrier for the wireless transmission described above. The mapper 330 can use various modulation schemes, including, but not limited to, Binary Phase-Shift Keying (BPSK), Quadrature Phase-Shift Keying (QPSK), and Quadrature Amplitude Modulation (QAM). In one embodiment, the mapper 330 is a QAM mapper, for example, a 16-QAM mapper or 64-QAM mapper. QAM is a modulation scheme which conveys data by modulating the amplitude of two carrier waves. The two waves, usually two orthogonal sinusoids, are out of phase with each other by 90° and thus are called quadrature carriers. The number, 16 or 64, in front of "QAM" refers to the total number of symbols to which the mapper can map groups of data bits. For example, a 16-QAM mapper converts 4-bit data into $2^4=16$ symbols. Typically, for QAM mappers, a constellation diagram is used for representing the collection of such symbols.

The output of the mapper 330 is sent to a symbol interleaver 335 that rearranges the sequence of complex symbols output from the mapper. The illustrated symbol interleaver 335 is positioned after the mapper 330. In other embodiments, the symbol interleaver 335 may be positioned between the FEC and the mapper 330 in place of the bit interleaver. In such embodiments, the symbol interleaver permutes the predetermined number of bits as a symbol group. For example, in an embodiment where a QAM mapper maps four data bits to a complex symbol, the symbol interleaver is configured to interleave groups of four data bits.

In an embodiment where the symbol interleaver 335 is positioned after the mapper 330, the symbol interleaver rearranges the sequence of the symbols output from the mapper 330. In one embodiment, the symbol interleaver 335 can include a random interleaver which employs a fixed random permutation order and interleaves symbols according to the permutation order. For example, the random interleaver may use Radix-2 FFT (fast Fourier transform) operation. In other embodiments, the symbol interleaver 335 can include a block interleaver. A block interleaver accepts a set of symbols and rearranges them without repeating or omitting any of the symbols in the set. The number of symbols in each set is fixed for a given interleaver. The interleaver's operation on a set of symbols is independent of its operation on all other sets of symbols.

The output of the symbol interleaver 335 is sent to an inverse Fast Fourier Transform (IFFT) module 340. The IFFT 340 transforms frequency domain data from the error-correcting, mapping and interleaving modules back into corresponding time domain data. The IFFT module 340 converts a number of complex symbols, which represent a signal in the frequency domain, into the equivalent time domain signal. The IFFT module 340 also serves to ensure that carrier signals produced are orthogonal. The output of the IFFT 340 is sent to a cyclic prefix adder 345 so as to decrease receiver complexity. The cyclic prefix adder 345 may also be referred to as a guard interval inserter. The cyclic prefix adder 345 adds a cyclic prefix interval (or guard interval) to an IFFT-processed signal block at its front end. The duration of such a cyclic prefix interval may be 1/32, 1/16, 1/8, or 1/4 of the original signal block duration, depending on expected channel conditions and receiver cost and complexity.

At this point of the transmit chain 300, a preamble is part of the header 310 and prior to the IFFT-processed signal block. Generally, a preamble is selected by the designers of the system 200, such as previously described, and is standardized so that all devices of the system understand it. The preamble is used to detect start of the packet, estimate various channel parameters, such as symbol timing, carrier frequency offset.

A symbol shaping module 355 interpolates and low-pass filters the packet signal generated from the IFFT module 340, the cyclic prefix adder 345 and the preamble. The output of the symbol shaping module 355 is a complex baseband of the output signal of the IFFT module 340. An upconverter 360 upconverts the output of the symbol shaping module 355 to a radio frequency (RF) for possible transmission. A set of transmit antennas 365 transmit the signal output from the upconverter 360 over a wireless medium, such as the wireless channel 201 (FIG. 2) to a receiver. The transmit antennas 365 can include any antenna system or module suitable for wirelessly transmitting uncompressed HD video signals.

Figure 4:
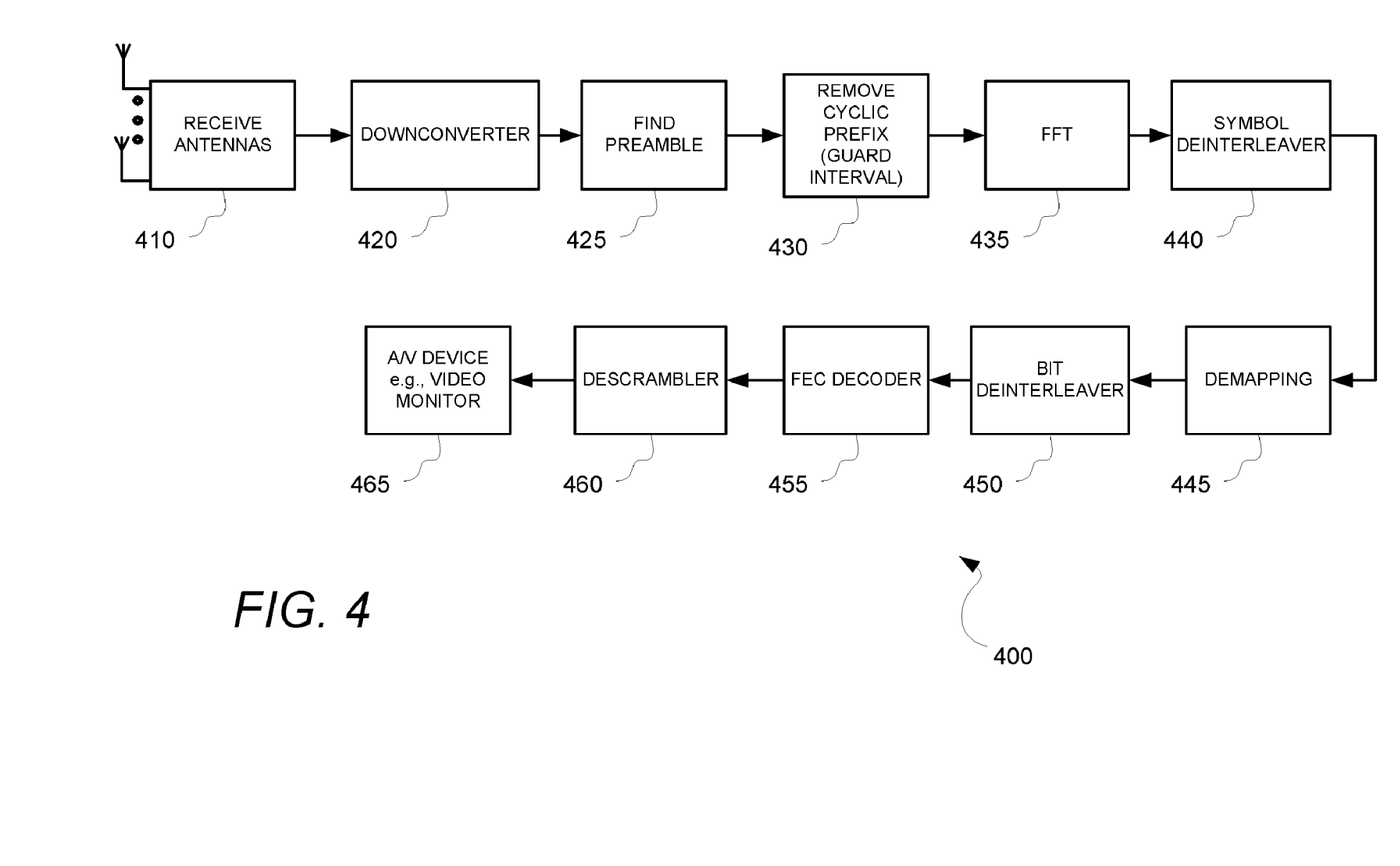
FIG. 4 is a functional block diagram illustrating an example of a receiver such as found in the wireless network of FIG. 1.
Figure 7:
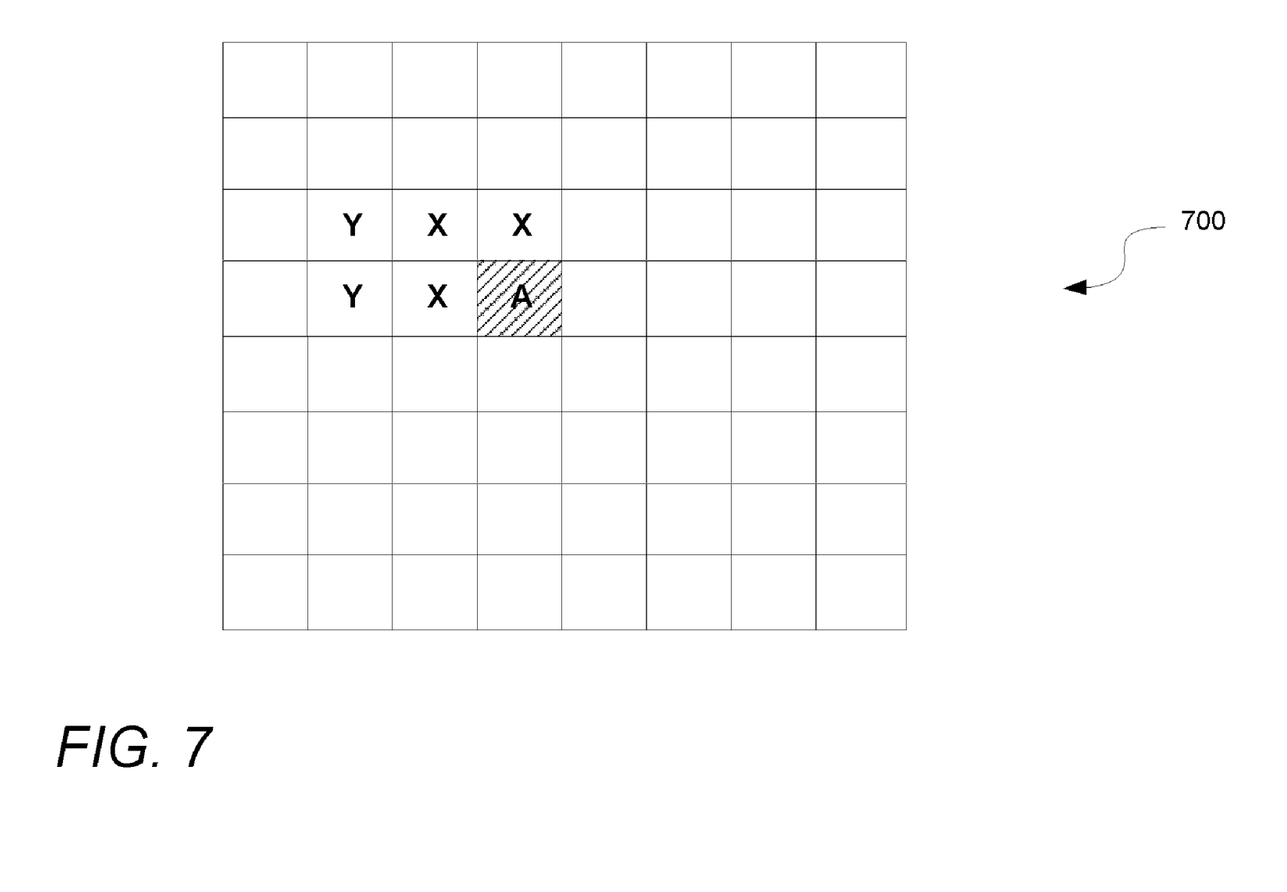
FIG. 7 is a diagram illustrating a block of pixels in a frame of pixel data received by a receiver such as illustrated in FIG. 4.

FIG. 4 is a functional block diagram illustrating a receiver chain 400 of modules, subsystems or devices, such as used in the PHY block 214 (FIG. 2). The receiver chain 400 generally performs an inverse process of that of the transmitter chain 300 of FIG. 3. The receiver 400 receives an RF signal via the wireless channel 201 (FIG. 2) at receive antennas 410 from the transmit antennas 365 of the transmitter chain 300. A downconverter 415 downconverts the RF signal to a signal of a frequency suitable for processing, or the baseband signal, which is already in the digital domain for easy digital signal processing. A preamble finder 420 then locates a preamble portion of the digital signal, finds the symbol starting timing, estimates the channel coefficients, estimates the carrier frequency offset and tries to compensate it via local processing. In certain embodiments, the preamble finder 420 includes a correlator and a packet start finding algorithm that can operate on the short training sequences of the preamble (FIGS. 4 and 7). After the preamble is identified by the finder 420, the preamble portion of a current signal packet is sent to a channel estimation, synchronization and timing recovery component 425, which will be further described below. A cyclic prefix remover 430 removes the cyclic prefix from the signal. Next, a fast Fourier transform (FFT) module 435 transforms the signal (a time-domain signal) into a frequency-domain signal. The output of the FFT 435 is used by a symbol deinterleaver 440 which rearranges the FFT output for a demapper 445. The demapper 445 converts the frequency-domain signal (a complex signal) into a bit stream in the time domain. A bit deinterleaver 450 rearranges the bit stream in the original bit stream sequence as before the bit interleaver 325 of FIG. 3.

Subsequently to the bit deinterleaving, a FEC decoder 455 decodes the bit stream, thereby removing redundancy added by the FEC 320 of FIG. 3. In one embodiment, the FEC decoder 455 includes a demultiplexer, a multiplexer, and a plurality of convolutional code (CC) decoders interposed between the demultiplexer and the multiplexer. Finally, a descrambler 460 receives the output from the FEC decoder 455, and then descrambles it, thereby regenerating the video data sent from the transmitter chain 300 of FIG. 3. A video device 465 can now display video using the video data. Examples of the video device include, but are not limited to, a CRT monitor, an LCD monitor, a rear-projection monitor, and a plasma display. It will be appreciated that audio data can also be processed and transmitted in the same manner along with video data by the wireless HD A/V system described above. The audio data can be processed and transmitted using a different wireless transmission scheme. The descrambler 460, FEC decoder 455, bit deinterleaver 450, demapper 445, symbol deinterleaver 440, FFT 435 cyclic prefix remover 430, down-converter 415 and receive antennas 410 of the receiver chain 400 perform analogous but inverse functions of the corresponding scrambler 315, FEC 320, bit interleaver 325, mapper 330, symbol interleaver 335, IFFT 340, cyclic prefix adder 345, upconverter 360 and transmit antennas 365 of the transmit chain 300.

Video signals can be represented by pixel data that encodes each pixel as several values, e.g., using a RGB color model (red, green, and blue), or a YUV (one luminance and two chrominance values). Generally, viewers are more sensitive to transmission errors or loss of data in the most significant bits (MSB) of pixel values than to errors or loss in the least significant bits (LSB) of pixel values. Thus, in one embodiment, the MSB of each pixel value (e.g. 4 out of 8 bits per color channel) is encoded with a different coding and/or modulation scheme than for the remaining LSB of each pixel value.

Figure 5:
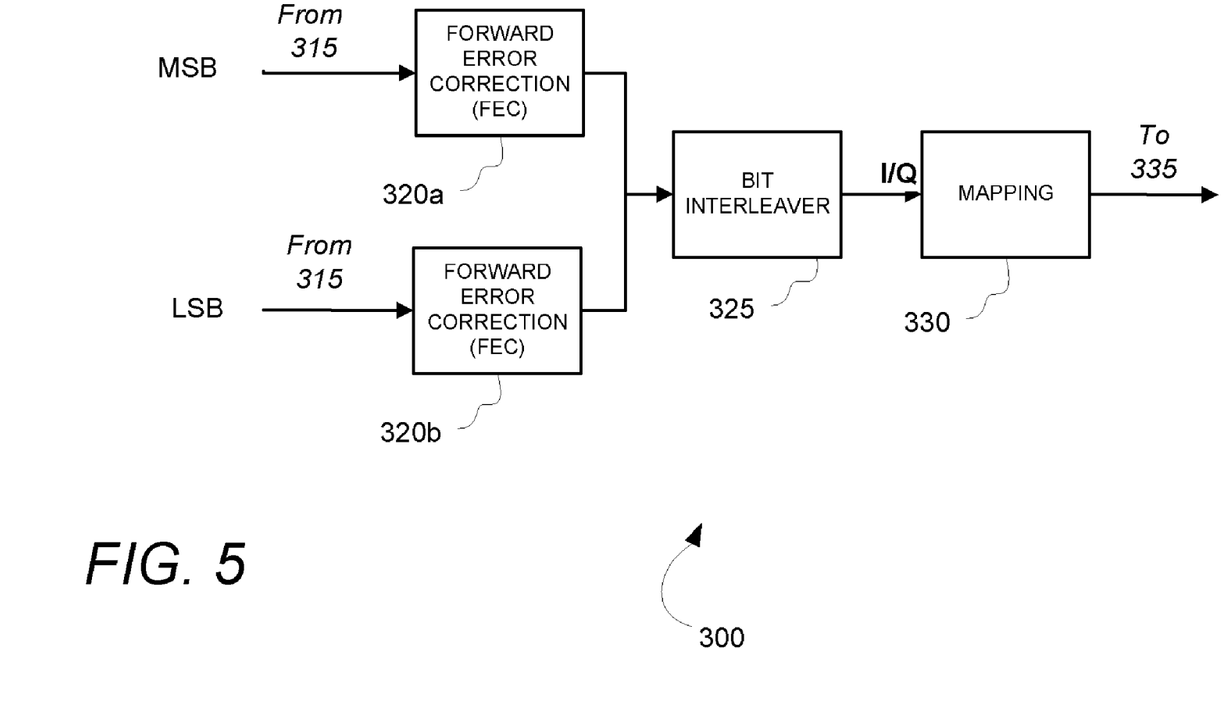
FIG. 5 is a functional block diagram further illustrating one embodiment of a transmitter such as the transmitter of FIG. 3.

FIG. 5 illustrates a portion of the components of the transmitter chain 300 of FIG. 4 according to one such embodiment. In the example illustrated FIG. 5, the MSB of pixel data is coded by FEC 320$a$ and the LSB data by FEC 320$b$. The coding and modulation for the MSB and LSB may be the same, e.g., providing equal error protection to both MSB and LSB bits of each pixel value. In one embodiment, the FEC 320$a$ encodes the MSB data with a 4/7 coding rate and the FEC 320$b$ encodes the LSB data with a 4/5 coding rate. Accordingly, in such an embodiment, the MSB portion of the pixel data is more strongly protected (has "unequal error protection" or UEP) from channel noise or interference than is the LSB of the pixel data.

In one embodiment, the mapper 330 is skewed to provide greater modulation gain to the MSB, e.g., Q, channel. In one such embodiment, the FEC 320$a$ and FEC 320$b$ use the same coding rate. In another embodiment, FEC 320$a$ and FEC 320$b$ use the different coding rates to further improve robustness of the MSB of the pixel data.

Figure 6:
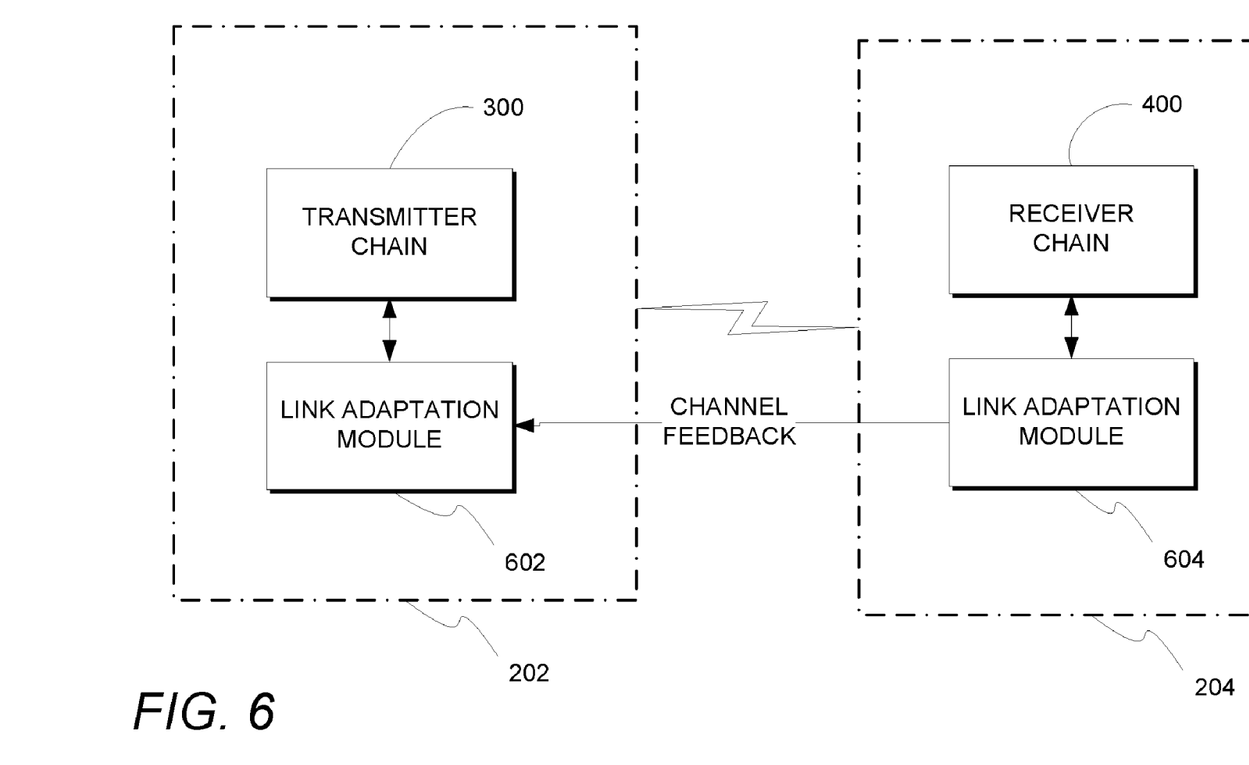
FIG. 6 is a functional block diagram further illustrating one embodiment of a transmitter and receiver of the system of FIG. 1.

FIG. 6 is a functional block diagram illustrating one embodiment of the transmitter 202 and the receiver 204 of FIG. 2 that further include link adaptation modules 602 and 604, respectively. The link adaptation module 602 of the transmitter 202 is coupled to the transmitter chain 300 of FIG. 3. The link adaptation module 604 of the receiver 204 is coupled to the receiver chain 400 of FIG. 4. The link adaptation module 602 of the transmitter 202 receives channel feedback data, e.g., bit error rates, from the link adaptation module 604 of the receiver 204. In one embodiment, the transmitter 202 is configured to vary the UEP of the MSB of the pixel data based on the channel feedback.

Conceptually, each pixel value is provided a given amount of bandwidth (e.g., a time period for transmission) of the channel. When UEP is used, more of this bandwidth is used to transmit the MSB of the pixel values.

In one embodiment, when channel conditions fall to specified levels, e.g., when retransmission of data is requested, the link adaptation module 602 switches the transmitter chain 300 to a mode in which only a specified number (e.g., 4 of 8, but which could be any of 1-7 of 8) of the MSB of the pixel values are transmitted using a different coding and/or modulation scheme to provide even stronger protection of the MSB of the pixel values. Thus, in such an embodiment, the entire bandwidth for the pixel value is used to transmit only the MSB pixel values.

The relationship between the modulation and coding used to transmit both the MSB and LSB data ($t_{MSB\_LSB}$) and the modulation and coding used to transmit only the MSB data ($t_{MSB}$) can be represented mathematically as $$t_{MSB\_LSB} = t_{MSB}.$$ (Equation 1)

If $2^{b1}$ is the number of bits in a constellation diagram of the modulation used for transmitting both MSB and LSB data, $2^{b2}$ is the number of bits in a constellation diagram of the modulation used for transmitting only MSB, k1/n1 is the coding rate for transmitting both MSB and LSB data, k2/n2 is the coding rate for transmitting MSB only, and r is ratio of the total number of bits that comprise the MSB of the data values (e.g., for 4 bits of MSB out of 8 in a pixel data value, r=½), then Equation 1 can be expressed as:

$$b1*k1/n1 = r*b2*k2/n2.$$ (Equation 2)

Thus, it is to be recognized that many combinations of b1, b2, k1/n1, r, k2/n2 can be used, depending on the embodiment. For example, with r=½, using the same modulation, e.g., QAM-16 (b1=b2=4) as transmitting MSB and LSB values, the coding rate can change in MSB only mode from k1/n1=⅔ to k2/n3=⅓. In another embodiment, the same coding rate can be used while the modulation changes from 16 QAM (b1=4) to QPSK (b2=2). In one embodiment, the modulation used for transmitting MSB only data is the equal to or stronger, e.g., less bits per symbol, than the modulation for MSB and LSB data.

In one embodiment, the transmitter transmits only the MSB data until measured channel conditions improve. In one embodiment, the transmitter transmits only the MSB data for a specified time period, e.g., a fixed number of packets or subpackets, or a variable number that depends, for example, on the channel conditions. In one embodiment, the number or MSB only packets, N, is determined by the receiver. In one embodiment, the transmitter 202 begins transmitting only MSB with a retransmitted packet then continues for N−1 packets. In one embodiment, the number of MSB transmitted is a specified value, e.g., 4 of 8 bits. In another embodiment, the number of MSB transmitted is identified based on channel characteristics. For example, when channel characteristics such as noise are worse (e.g., higher error rates on the channel), fewer, e.g., only ⅜, MSB of each pixel value are transmitted.

The receiver 204 may use error concealment schemes to compensate for the non-transmitted LSB pixel data. For example in one embodiment, the LSB data is replaced with random bit data. In one embodiment, the LSB data is replaced with one or more fixed values (e.g., all zeros). In one embodiment, the transmitter 202 sends average values of non-transmitted LSB values so that the receiver 204 can interpolate the non-transmitted LSB data. For example, the transmitter 202 may indicate in a control header that average value of LSBs are to be transmitted reliably, e.g., in an "LSB-only" mode. Similar to the MSB only transmission mode described above, such an LSB-only mode can provide "unequal error protection" for average LSB data or other data for use in interpolating missing LSB. In one embodiment, the transmitter 202 may send average LSB data in the LSB-only mode periodically, e.g., between one or more time periods or packets of MSB-only data. In one embodiment, a counter or other data structure is maintained that counts how many packets are transmitted in LSB-only mode. When a specified count of packets, e.g., one packet of LSB-only data has been transmitted, the transmitter 202 returns to the MSB-only transmission mode.

FIG. 7 is a diagram illustrating a block 700 of pixels in a frame of pixel data. In the illustrated block, pixels marked "X" and "Y" have been received. In one embodiment, the receiver 204 interpolates non-transmitted LSB data for a pixel "A" by interpolating based on adjacent "X" data and/or nearby "Y" data.

In one embodiment, the transmitter 202 sends control data to the receiver 204 to indicate that only MSBs of the pixel values are being transmitted. In one embodiment, this control data is sent in a header field.

Figure 8:
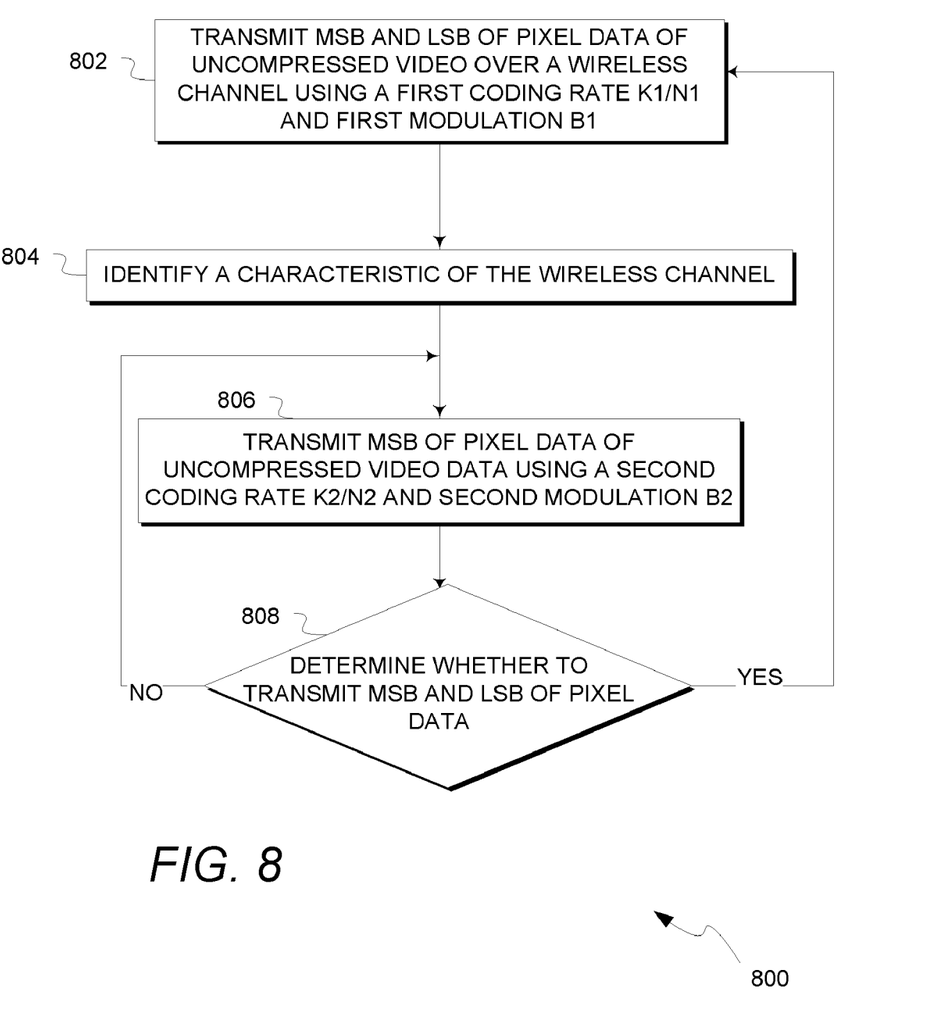
FIG. 8 is a flowchart illustrating one embodiment of a method of transmitting pixel data using a transmitter such as illustrated in FIG. 5.

FIG. 8 is a flowchart illustrating one embodiment of a method 800 of transmitting pixel data using the transmitter 202. The method 800 begins at a block 802 in which the transmitter 202 transmits the MSB and LSB of pixel data of uncompressed video over a wireless channel using a first coding rate, k1/n1, and first modulation, b1. Next at a block 804, the link adaptation module 602 (FIG. 5) identifies a characteristic of the wireless channel, e.g., bit or frame error rates above a threshold, or retransmission of a packet is needed In one embodiment, the characteristic identified is based on data received from the link adaptation module 604 of the receiver 204. In one embodiment, the characteristic is identified based on a request by the receiver 204 for retransmission of a packet of data. In one embodiment, the channel characteristic comprises comparing channel feedback (CF) provided by the receiver 202 to specified threshold values. In one embodiment, the threshold is based on a combination of different forms of channel feedback. Such channel feedback may include one or more of signal-to-interference and/or signal-to-noise ratio (SINR), packet error rate, or bit-error-rate. In one embodiment, the application layer 210 (FIG. 2) at the receiver 202 provides feedback such as a measure of picture quality, e.g., peak signal-to-noise ratio (PSNR).

In one embodiment in which beam tracking of signals is used, how frequently the physical layer 206 performs beam searching may be indicative of channel quality. Thus, for example, channel feedback may include whether beam searching occurs more frequently than a specified frequency.

Next at a block 806, the transmitter 202 transmits the MSB of the pixel data of uncompressed video data using a second coding rate K2/N2 and second modulation B2. As discussed above with reference to FIG. 6, various combinations of coding and modulation may be used for coding the MSB data, including those that satisfy Equation 2.

Moving to a block 808, the transmitter 202 determines whether to transmit MSB and LSB pixel data. If specified conditions for transmitting MSB and LSB data are met, the method 800 returns to the block 802. Otherwise, the method 800 returns to the block 806 in which the transmitter 202 transmits additional MSB pixel data using the second coding rate.

In one embodiment, the transmitter 202 maintains a count of packets or subpackets at the second rate and modulation and return to block 802 to transmits MSB and LSB pixel data when a specified count of packets are transmitted. In another embodiment, the transmitter 202 continues to transmit MSB data using the second coding and modulation and may periodically transmit LSB data until received channel feedback meets specified conditions. In one embodiment, the transmitter 202 may identify a characteristic of the wireless channel for returning to transmission of MSB to LSB pixel values that is different from the characteristic identified at the block 804 for transmitting only MSB pixel values. For example, different specified values of one or more channel feedback characteristics may be used to determining when to begin MSB-only transmission than those used for determining when to return to transmission of MSB and LSB data. In one embodiment, this difference may provide hysteresis to prevent frequent changes at marginal conditions.

As discussed above, in one embodiment of MSB only transmission mode, LSBs are interpolated at the receiver. However, it is possible that the interpolated LSBs may be too far off from the actual values, i.e., after interpolation PSNR is too low, e.g., below above a specified threshold, even though MSBs are correctly received. In one embodiment, the LSB only transmitting mode, described above with reference to the receiver 204 of FIG. 6, may be used to provide accurate LSB data. In one embodiment, referring back to the block 808, the specified conditions for the method 800 proceeding to the block 802 may include whether feedback from the receiver 204 of the PSNR of previous MSB-only data is below a specified threshold. For example, when, the transmitter 202 may maintain a counter of transmitted MSB-only packets for which the PSNR is below the specified threshold, when a specified limit of such MSB-only packets with PSNR values below the threshold is reached, the transmitter 202 resets the counter and the methods proceeds to the block 802 in which both MSB and LSB data is transmitted once.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A method of transmitting uncompressed video, the method comprising:
    transmitting uncompressed video data comprising a first number of bits for each of a plurality of pixels over a wireless channel using a first coding rate and first modulation, wherein said first coding rate comprises error correction encoding;
    identifying a characteristic of the wireless channel; and
    in response to identifying the characteristic of the channel, transmitting uncompressed video data comprising a second number of bits for each of a second plurality of pixels over the wireless channel using a second coding rate and second modulation, wherein said second coding rate comprises error correction encoding, and wherein the second number of bits is smaller than the first number of bits, wherein the second number of bits includes higher order bits of each of the second plurality of pixels, and the first number of bits includes the higher order and the lower order bits of each of the first plurality of pixels, and wherein the higher order bits are encoded by a first encoder and the lower order bits are encoded by a second encoder, wherein the first number of bits that are non-transmitted are replaced, wherein the non-transmitted first number of bits are replaced with interpolated bit data based on transmitted average values of the non-transmitted first number of bits, and
    wherein the second number of bits consists of the most significant bits (MSB) of each of the second plurality of pixels and the first number of bits comprises the MSB and the least significant bits (LSB) of each of the first plurality of pixels, and wherein the MSB are encoded by the first encoder and the LSB are encoded by the second encoder.

2. The method of claim 1, wherein at least one of the second coding rate and the second modulation is different from at least one of the first coding rate and the first modulation.

3. The method of claim 1, wherein the first modulation comprises quadrature amplitude modulation (QAM) and the second modulation comprises at least one of quadrature phase shift keying (QPSK) and QAM.

4. The method of claim 1, wherein the second modulation comprises less bits per symbol than the first modulation.

5. The method of claim 1, wherein the second number of bits comprises less than all of the bits of the value of the at least one of the pixels.

6. The method of claim 1, further comprising identifying the second number of bits based on the characteristic of the wireless channel.

7. The method of claim 1, wherein identifying the characteristic of the wireless channel comprises comparing at least one of signal-to-interference ratio, signal to noise ratio, packet error rate, bit error rate, and peak signal-to-noise ratio to a threshold.

8. The method of claim 1, wherein said second plurality of pixels is transmitted in a specified number of packets.

9. The method of claim 1, further comprising:
    identifying a second characteristic of the wireless channel; and
    in response to identifying the second characteristic of the channel, transmitting uncompressed high definition (HD) video data comprising the first number of bits for each of a third plurality of pixels over the wireless channel using the first coding rate and the first modulation.

10. The method of claim 1, further comprising:
    interpolating values for untransmitted ones of the first number of bits of at least one of the pixels in response to identifying the characteristic of the channel as having bit or frame error rates greater than a predetermined threshold.

11. The method of claim 10, wherein the interpolating is based on at least one adjacent pixel.

12. The method of claim 10, further comprising:
    transmitting data indicative of values for untransmitted ones of the first number of bits of at least one of the pixels, wherein the interpolating is based on the transmitted data.

13. The method of claim 10, wherein the interpolating is based on a random value.

14. The method of claim 1, wherein the channel characteristic comprises comparing channel feedback (CF) provided by a receiver to threshold values.

15. The method of claim 14, wherein the threshold is based on one or more of signal-to-interference, signal-to-noise ratio, packet error rate and bit-error-rate.

16. The method of claim 15, wherein the CF is based on picture quality.

17. The method of claim 14, wherein unequal error protection (UEP) of the most significant bits (MSB) of the pixel data is varied based on the CF.

18. The method of claim 17, wherein the UEP of the MSB of the pixel data is more strongly protected from channel noise or interference than is the LSB of the pixel data.

19. The method of claim 1, wherein the first coding rate comprises a coding rate for transmitting both most significant bits (MSB) and least significant bits (LSB) pixel data, and the second coding rate comprises a coding rate for transmitting only MSB pixel data.

20. The method of claim 19, further comprising only transmitting MSB pixel data until measured channel conditions improve above a threshold.

21. The method of claim 19, further comprising performing error concealment for replacement of non-transmitted LSB pixel data.

22. The method of claim 1, wherein said error correction encoding comprises forward error correction (FEC) encoding.

23. The system of claim 1, further comprising:
    upon retransmission data being requested, the adaptation module switches a transmitter to a mode in which a portion of the MSB of pixel values are transmitted using another encoding for providing stronger protection of the MSB pixel values.

24. The method of claim 1, wherein the non-transmitted first number of bits are replaced with random bit data.

25. The method of claim 1, wherein the non-transmitted first number of bits are replaced with one or more fixed values.

26. A system for transmitting uncompressed video, the system comprising:
a transmitter configured for transmitting uncompressed video data comprising a first number of bits for each of a plurality of pixels over a wireless channel using a first coding rate and first modulation, wherein said first coding rate comprises error correction encoding; and
an adaptation module in communication with the transmitter and configured for identifying a characteristic of the wireless channel,
wherein the transmitter, in response to the adaptation module identifying the characteristic of the channel, is further configured for transmitting uncompressed video data comprising a second number of bits for each of a second plurality of pixels over the wireless channel using a second coding rate and second modulation, wherein said second coding rate comprises error correction encoding, and wherein the second number of bits is smaller than the first number of bits, wherein the second number of bits only includes higher order bits of each of the second plurality of pixels and the first number of bits includes the higher order and lower order bits of each of the first plurality of pixels, and wherein the higher order bits are encoded by a first encoder and the lower order bits are encoded by a second encoder, wherein the first number of bits that are non-transmitted are replaced, wherein the non-transmitted first number of bits are replaced with interpolated bit data based on transmitted average values of the non-transmitted first number of bits, and
wherein the second number of bits consists of the most significant bits (MSB) of each of the second plurality of pixels and the first number of bits comprises the MSB and the least significant bits (LSB) of each of the first plurality of pixels, and wherein the MSB are encoded by the first encoder and the LSB are encoded by the second encoder.

27. The system of claim 26, wherein at least one of the second coding rate and the second modulation is different from at least one of the first coding rate and the first modulation.

28. The system of claim 26, wherein the first modulation comprises quadrature amplitude modulation (QAM) and the second modulation comprises at least one of quadrature phase shift keying (QPSK) and QAM.

29. The system of claim 26, wherein the second modulation comprises less bits per symbol than the first modulation.

30. The system of claim 26, wherein the fewer than the first number of bits comprises only the most significant bits (MSB) of a value of at least one of the pixels.

31. The method of claim 30, wherein the second number of bits comprises less than all of the bits of the value of the at least one of the pixels.

32. The system of claim 26, the adaptation module is further configured for identifying the second number of bits based on the characteristic of the wireless channel.

33. The system of claim 26, wherein the transmitter is configured for identifying the characteristic of the wireless channel based on comparing at least one of signal-to-interference ratio, signal to noise ratio, packet error rate, bit error rate, and peak signal-to-noise ratio to a threshold.

34. The system of claim 26, wherein said second plurality of pixels is transmitted in a specified number of packets.

35. The system of claim 26, wherein the adaptation module is further configured for identifying a second characteristic of the wireless channel, and wherein in response to identifying the second characteristic of the channel, the transmitter is configured for transmitting uncompressed high definition (HD) video data comprising the first number of bits for each of a third plurality of pixels over the wireless channel using the first coding rate and the first modulation.

36. The system of claim 26, further comprising:
a receiver that receives the uncompressed video data and compensates for untransmitted ones of the first number of bits of at least one of the pixels by performing interpolation.

37. The system of claim 36, wherein the interpolation is based on at least one adjacent pixel.

38. The system of claim 36, wherein the interpolation is based on a random bit value.

39. A system for transmitting uncompressed video, the system comprising:
means for transmitting uncompressed video data comprising a first number of bits for each of a plurality of pixels over a wireless channel using a first coding rate and first modulation, wherein said first coding rate comprises error correction encoding; and
means for identifying a characteristic of the wireless channel,
wherein the transmitting means, in response to the identifying means, is further configured for transmitting uncompressed video data comprising a second number of bits for each of a second plurality of pixels over the wireless channel using a second coding rate and second modulation, wherein said second coding rate comprises error correction encoding, and wherein the second number of bits is smaller than the first number of bits, wherein the second number of bits only includes higher order bits of each of the second plurality of pixels and the first number of bits includes the higher order and lower order bits of each of the first plurality of pixels, and wherein the higher order bits are encoded by a first encoder and the lower order bits are encoded by a second encoder, wherein the first number of bits that are non-transmitted are replaced, wherein the non-transmitted first number of bits are replaced with interpolated bit data based on transmitted average values of the non-transmitted first number of bits, and
wherein the second number of bits consists of the most significant bits (MSB) of each of the second plurality of pixels and the first number of bits comprises the MSB and the least significant bits (LSB) of each of the first plurality of pixels, and wherein the MSB are encoded by the first encoder and the LSB are encoded by the second encoder.

40. The system of claim 39, further comprising:
means for receiving the uncompressed video data, the receiving means configured for replacement of untransmitted ones of the first number of bits by interpolating values based on at least one of the pixels.

41. A method of transmitting uncompressed video, the method comprising:
transmitting uncompressed video data comprising a first number of bits for each of a plurality of pixels over a wireless channel using a first coding rate and first modulation, wherein said first coding rate comprises error correction encoding;
identifying a characteristic of the wireless channel; and
in response to identifying the characteristic of the channel, transmitting uncompressed video data comprising a second number of bits for each of a second plurality of pixels over the wireless channel using a second coding rate and second modulation that provides a stronger error protection to the second number of bits than the first modulation provides to the first number of bits, wherein said second coding rate comprises error correction encoding, and wherein the second number of bits is smaller than the first number of bits, wherein the second number of bits only consists of the most significant bits (MSB) of each of the second plurality of pixels and the first number of bits consists of the MSB and the least significant bits (LSB) of each of the first plurality of pixels, wherein the MSB are encoded by a first encoder and the LSB are encoded by a second encoder, and wherein at least one bit of the second plurality of pixels is configured to be interpolated by a receiver, wherein the first number of bits that are non-transmitted are replaced, and the non-transmitted first number of bits are replaced with interpolated bit data based on transmitted average values of the non-transmitted first number of bits.

* * * * *